(12) United States Patent
Lemieux (10) Patent No.: US 6,692,009 B2
(45) Date of Patent: Feb. 17, 2004

(54) SNOWMOBILE SKI WITH OFFSET RUNNER AND KEEL

(75) Inventor: René Lemieux, Granby (CA)

(73) Assignee: Bombardier Recreation Products Inc., Saint-Bruno (CA)

( * ) Notice: Subject to any disclaimer, the term of this patent is extended or adjusted under 35 U.S.C. 154(b) by 46 days.

(21) Appl. No.: 09/928,659

(22) Filed: Aug. 14, 2001

(65) Prior Publication Data

US 2002/0036387 A1 Mar. 28, 2002

Related U.S. Application Data (60) Provisional application No. 60/234,342, filed on Sep. 22, 2000.

(51) Int. Cl.$^7$ ............................................. B62M 11/00
(52) U.S. Cl. .......................... 280/28; 280/22; 280/22.1
(58) Field of Search .................... 280/28, 182, 184, 280/186, 190, 21.1, 22, 22.1, 28.14, 28.16, 601, 609, 900, 28.15, 11.18; 180/180

(56) References Cited

U.S. PATENT DOCUMENTS

| | | | |
|---|---|---|---|
| 878,326 A | 2/1908 | Abelson | |
| 1,957,372 A | 5/1934 | Thompson | |
| 3,482,849 A | 12/1969 | Puetz | |
| 3,501,160 A | 3/1970 | Lange | |
| 3,643,979 A * | 2/1972 | Richards | 280/28 |
| 3,645,347 A | 2/1972 | Brant | |
| 3,726,354 A * | 4/1973 | LaPlante | 280/21.1 |
| 3,734,221 A * | 5/1973 | Labelle | 180/190 |
| 3,817,544 A * | 6/1974 | Labelle | 280/28 |
| 3,942,812 A * | 3/1976 | Kozlow | 280/28 |
| 4,509,766 A | 4/1985 | Yasui et al. | |
| 4,826,201 A | 5/1989 | Varan et al. | |
| 4,895,388 A | 1/1990 | Richmond | |
| 5,038,882 A * | 8/1991 | Zulawski | 180/190 |
| 5,040,818 A * | 8/1991 | Metheny | 280/609 |
| 5,145,195 A | 9/1992 | Campbell et al. | |
| 5,145,201 A * | 9/1992 | Metheny | 280/609 |
| 5,405,161 A | 4/1995 | Petkov | |
| 5,443,278 A * | 8/1995 | Berto | 280/28 |
| 5,599,030 A | 2/1997 | Campbell et al. | |
| 5,649,722 A | 7/1997 | Champlin | |
| 5,700,020 A | 12/1997 | Noble | |
| 5,836,594 A * | 11/1998 | Simmons | 280/28 |
| 6,276,699 B1 | 8/2001 | Simmons et al. | |
| 6,431,561 B1 * | 8/2002 | Hedlund | 280/28 |
| 2002/0074752 A1 * | 6/2002 | Noble | 280/28 |

FOREIGN PATENT DOCUMENTS

| | | |
|---|---|---|
| JP | 2000 43735 | 2/2000 |
| JP | 2000 289684 | 10/2000 |

* cited by examiner

*Primary Examiner*—Brian L. Johnon
*Assistant Examiner*—J. Allen Shriver
(74) *Attorney, Agent, or Firm*—BRP Legal Services; Steward Strickland (57) ABSTRACT

A snowmobile ski includes a bridge adapted to connect to a ski leg of a snowmobile, a ski body having an inner lateral edge, an outer lateral edge, a top surface adapted to be connected the bridge, and a bottom surface adapted for moving over snow, a keel running lengthwise along the bottom surface of the ski body in such a manner that a centerline of the keel is offset from a centerline of the bridge in a direction toward the outer lateral edge of the ski body, and a runner connected to the keel.

20 Claims, 6 Drawing Sheets

SNOWMOBILE SKI WITH OFFSET RUNNER AND KEEL

This Application claims the benefit of priority to U.S. Provisional Patent application Ser. No. 60/234,342, which was filed on Sep. 22, 2000.

BACKGROUND OF THE INVENTION

1. Field of the Invention

The present invention relates to a snowmobile ski, and particularly, a snowmobile ski having an offset runner and keel and a snowmobile ski having longitudinally extending snow compacting ribs.

2. Description of Related Art

In designing snowmobile skis, there are several performance criteria, which are deemed to be important. These include, inter alia, maneuverability, steerability, stability, flotation, and side-hilling capability. "Maneuverability" is also referred to as "aggressivity" in the industry and describes the ability of the skis to provide an effective and superior handling/steering of the sled in response to the turning of the steering bar of the snowmobile. "Steerability" refers to the relative ease with which the sled can be steered with the skis. By definition, a set of skis is easy to steer when the resistance to the steering is kept minimal. "Stability" addresses the pitching and darting tendency of the snowmobile skis during the ride. Rather than being aligned in the intended direction without much wavering, snowmobile skis may pitch and dart, thereby requiring frequent adjustments of the steering system in order to steer the skis and the sled in the intended driving direction. "Floatation" refers to the performance of the skis on powder snow (as opposed to compact trails or ice) which allows the sled to be propelled over snow. In such applications as mountain snowmobiles, superior floatation characteristics are essential, as the snowmobile will often be driven on deep fresh powder snow. Finally, "side-hilling capability" refers to the performance of the snowmobile skis, typically on mountain snowmobiles, when the sled climbs a hill by traversing diagonally up the hill in a zigzag fashion. In side-hilling, the snowmobile is tilted in the direction of the turn, and as a result, the ski on the tilted side tends to be relied upon more heavily than the ski on the other side during each turn. In instances where the skis have poor side-hilling capabilities, the snowmobile may slip laterally because not enough snow is engaged by the skis when tilted on one side.

Depending on the intended application of the snowmobiles, the particularities of the designs of the snowmobile skis or the methods of attaching the skis to the snowmobile can be varied so as to optimize the desired performance characteristics of the skis. Indeed, prior patents illustrate numerous examples of attempts to improve desirable characteristics of the snowmobile skis.

For example, U.S. Pat. No. 5,038,882 (the "'882 patent") shows a conventional snowmobile ski which comprises a ski liner adopted to be connected to a bridge on its top surface, a keel disposed longitudinally along the bottom snow-contacting surface of the ski liner, and a runner (also referred to as a "wear rod" in the art) disposed on the keel. The bridge connected to the ski liner's top surface is adopted to connect to the ski leg of the snowmobile. The ski shown in the '882 patent is typical of conventional skis in that the keel extends longitudinally along the middle of the ski bottom surface. The '882 patent states that a more comfortable ride can be obtained by a spindle arrangement which offsets its longitudinal axis from the ball joints connected to each spindle. Such offset spindle arrangement, according to the '822 patent, induces the ski to "toe-out" thereby providing improved stability, i.e., less pitching and darting.

In other examples, U.S. Pat. Nos. 5,040,818 and 5,145,201 disclose a snowmobile ski having a plurality of concave surfaces extending along the snow contacting bottom surface of the ski. The ski shown in these two patents has a center concave surface extending along the middle of the ski and two concave steering surfaces, which is recessed from the center concave surface. The '818 and '201 patents state that the plurality of concave portions provides floatation by compacting snow and lifting the ski and that the lateral recessed steering portions provide better stability and control as the ski turns. However, the center concave surface extends on the bottom surface of the keel, which longitudinally extends along the middle of the ski, as done in other conventional skis. Similarly, while U.S. Pat. No. 3,643,979 shows a snowmobile ski having recessed lateral surfaces or stepped portions, the ski in the '979 patent also has a runner and a keel longitudinally extending along the middle of the ski in a conventional manner.

While snowmobile skis disclosed in the aforementioned patents have keels and runners longitudinally extending along the middle of the skis, several other prior patents disclose snowmobile skis with the keels or runners at the lateral sides of the skis, thereby forming a shape of a tunnel or channel. For example, U.S. Pat. Nos. 3,734,221 and 3,817,544 disclose a snowmobile ski having a longitudinally extending central groove that creates a concave shape. The runners are provided on both sides of the groove, and the central groove is said to provide improved steerability. Finally, U.S. Pat. No. 5,836,594 discloses a double-keel snowmobile ski having the keels extending down from the two lateral edges of a flat middle portion of the ski liner, wherein vertically and horizontally extending wedges are provided at the longitudinal ends of the keel and a concave front portion of the ski liner is provided to funnel the snow to the middle portion of the ski liner. According to the '594 patent, a snowmobile ski with the double-keel arrangement disclosed therein enhances floatation, efficient turning, and smooth forward and reverse movement.

These and other prior art snowmobile skis heretofore are available, however, do not teach or suggest a snowmobile ski having an offset runner and keel with longitudinally extending snow compacting ribs disposed slanting upward from the keel toward the inner lateral edge of the ski. Snowmobiles skis having these features in accordance with the present invention provide improved performance characteristics beneficial for use in mountain snowmobiles as well as touring type snowmobiles.

SUMMARY OF THE INVENTION

It is an object of the present invention to provide a novel snowmobile ski with improved performance characteristics for use in both powder snow applications (which is generally beneficial for mountain snowmobiles) and trail applications (which is generally beneficial for touring snowmobiles). It is a further object of the present invention to provide a snowmobile ski with excellent maneuverability, stability, steerability, floatation and side-hilling characteristics.

It is an aspect of the present invention to have a ski body with an inner lateral edge, an outer lateral edge, a top surface, a bridge integrally molded with the top surface, and a bottom surface adapted for moving over snow. The inner lateral edge is defined as being the edge, which faces towards the centerline of the snowmobile and the outer lateral edge is defined as being the edge which faces away from the centerline of the snowmobile.

According to an aspect of the present invention, a snowmobile ski has a bridge adapted to connect to a ski leg of a snowmobile, and the ski body with the inner lateral edge and the outer lateral edge. The top surface of the ski body is adapted to be connected the bridge, and the bottom surface of the ski body is adapted for moving over snow.

A single keel is provided lengthwise along the bottom surface of the ski body in such a manner that a centerline of the keel is offset from a centerline of the bridge in a direction toward the outer lateral edge of the ski body. Finally, a runner is connected to the keel on one axial side of the ski body.

Another aspect of the present invention provides a snowmobile ski with a longitudinally extending rib arranged on the snow contacting bottom surface of the ski body between the inner lateral edge of the ski body and the keel, which is disposed lengthwise along the bottom surface of the ski body in such a manner that a longitudinal axis of the keel is offset from a longitudinal axis of the bridge in a direction toward the outer lateral edge of the ski body.

In accordance with yet another aspect of the present invention, a snowmobile ski has a plurality of longitudinally extending snow compacting channels arranged on the bottom surface of the ski body. In the preferred embodiment, each of these snow compacting portions extend from the ski body to different levels, but as illustrated in a second embodiment, the compacting portions could be situated at the same level. When viewed cross-sectionally along the transverse direction of the ski, the preferred arrangement of the snow compacting portions are arranged such that the bottom surface of the ski is generally inclined in a direction from the keel toward the inner lateral edge.

It is still yet another aspect of the present invention that a snowmobile ski has a ski body with an inner lateral edge and an outer lateral edge where the snowmobile ski has a keel which extends downwardly from the bottom surface of the ski body at the outer lateral edge and only one runner which is attached to the keel.

According to another aspect of the invention, a snowmobile ski has a ski body with an integrally molded bridge. The integrally molded bridge is adapted to be connected to a ski leg of a snowmobile. Also molded into the bridge are indentations to accept steel bushings, which are press-fitted into the indentations to ensure a solid surface between the ski body and the ski-leg. The bushing are designed such that head of the nut and bolt holding the ski-leg to the bridge do not increase the width of the ski. A single keel is provided lengthwise along the bottom surface of the ski body in such a manner that a centerline of the keel is offset from a centerline of the bridge and or the centerline of the ski width, in a direction toward the outer lateral edge of the ski body. The centerline of the ski is determined by a line, which separates the ski body in a left side and a right of the same width. Finally, a runner is connected to the keel on one axial side of the ski body.

In another aspect of the invention, along each side of the longitudinal rib disposed on the bottom surface of the ski body is defined snow compacting portions which extend from the ski body at different levels, such that when viewed cross sectionally, the bottom surface of the ski generally inclines in a direction from the keel toward the inner lateral edge.

A flat section between the keel and the outside lateral edge of the ski improves maneuverability and reduces snow projection.

Other objects and advantages of the present invention will be apparent from the appended claims and understood from the following detailed description of the present invention and the following drawings.

BRIEF DESCRIPTION OF THE DRAWINGS

Reference will be made hereinafter to the accompanying drawings which illustrate embodiments of the present invention discussed herein below, wherein.

DETAILED DESCRIPTION OF THE PRESENT INVENTION

A snowmobile ski according to the present invention is shown in FIGS. 1–8, and includes a bridge 12 provided with openings 34 and bushings 35 for connecting the bridge to a ski leg of a snowmobile (not shown), a ski body 14 connected to the bridge 12, a keel 24 and a runner 40. The ski body 14 is preferably formed from compression-molded plastic, and more preferably from ultra high molecular weight plastic (UHMW), but as would be recognized by one skilled in the art, any suitable material can be used.

The ski body 14 includes a top surface 20 and a bottom surface 22. The ski body 14 is sometimes referred to as a ski liner or ski base 14. A perimeter of the ski body 14 includes an inner lateral edge 18 and an outer lateral edge 16. The inner lateral edge 18 is defined to be that portion of the ski body 14 which when arranged on a ski leg of a snowmobile forms an inside dimension of the snowmobile. In contrast, the outer lateral edge 16 is that portion of the ski body 14 which forms an outside dimension of the overall snowmobile body. Typically, a standard ski width is about 5¼ inches. The ski width of the present invention is about 6½ to 8 inches, which improves the flotation characteristic of the ski.

The bridge 12 is arranged on the top surface 20 of the ski body 14. The bridge 12 may be a separate component, which is bolted to the ski body 14, or the bridge 12 may be an integrally molded part of the ski body 14. Typically, when the bridge is formed as a separate component, the bridge is formed from a metal material. It is to be understood, however, that when the bridge 12 is integrally molded with the ski body 14, each of the bridge 12 and ski body 14 is formed from a plastic material, preferably ultra high molecular weight plastic, but to increase rigidity, a separate metal bridge can be placed onto the molded bridge 12. A centerline of the bridge 12 is shown in FIG. 3 and is designated as 28 as well the center line 29 of the ski body 14 is shown to be a distance D2 and D3 respectively from the inner lateral edge 18.

The keel 24 is arranged such that a centerline 26 of the keel 24 is offset from the centerline 28 of the bridge 12 by a distance D and the center line 29 of the ski body 14 by a distance D1, in a direction toward the outer lateral edge 16, and further such that an outer surface 24a of the keel 24 is located between the outer lateral edge 16 and the centerline 28 of the bridge 12. The arrow in FIG. 2 indicates a longitudinal direction of the ski 10. In a first embodiment of the present invention, the keel extends downwardly from the bottom surface 22 at the outer lateral edge 16 of the ski body 14. However, it has been found that advantages are achieved by decreasing the degree of indentation of the keel 24 while still maintaining the offset positioning between the centerline 26 of the keel 24 and the centerline 28 of the bridge 12.

Figure 1:
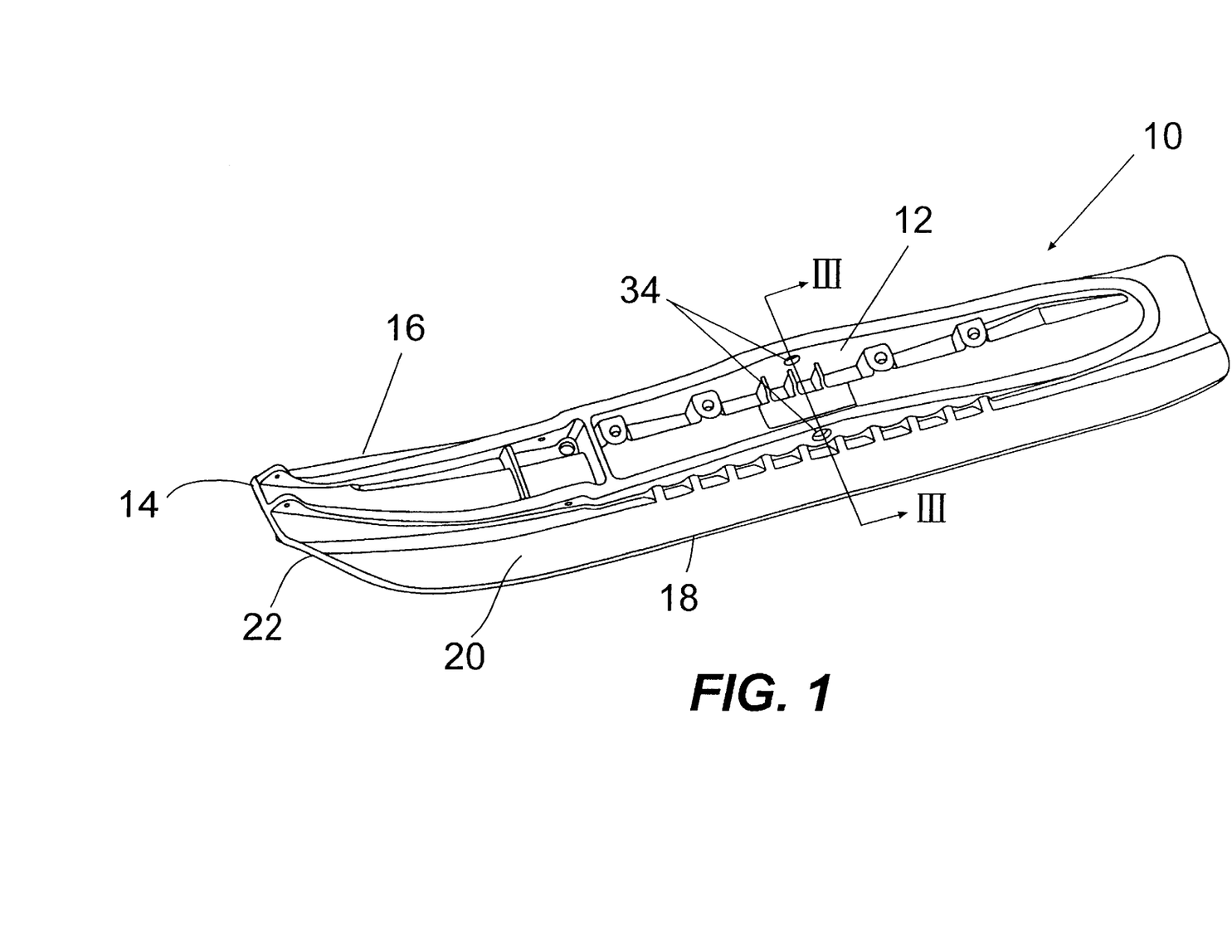
FIG. 1 is a top perspective view of a first embodiment of a snowmobile ski with an integrally molded bridge portion in accordance with the principles of the present invention.
Figure 2:
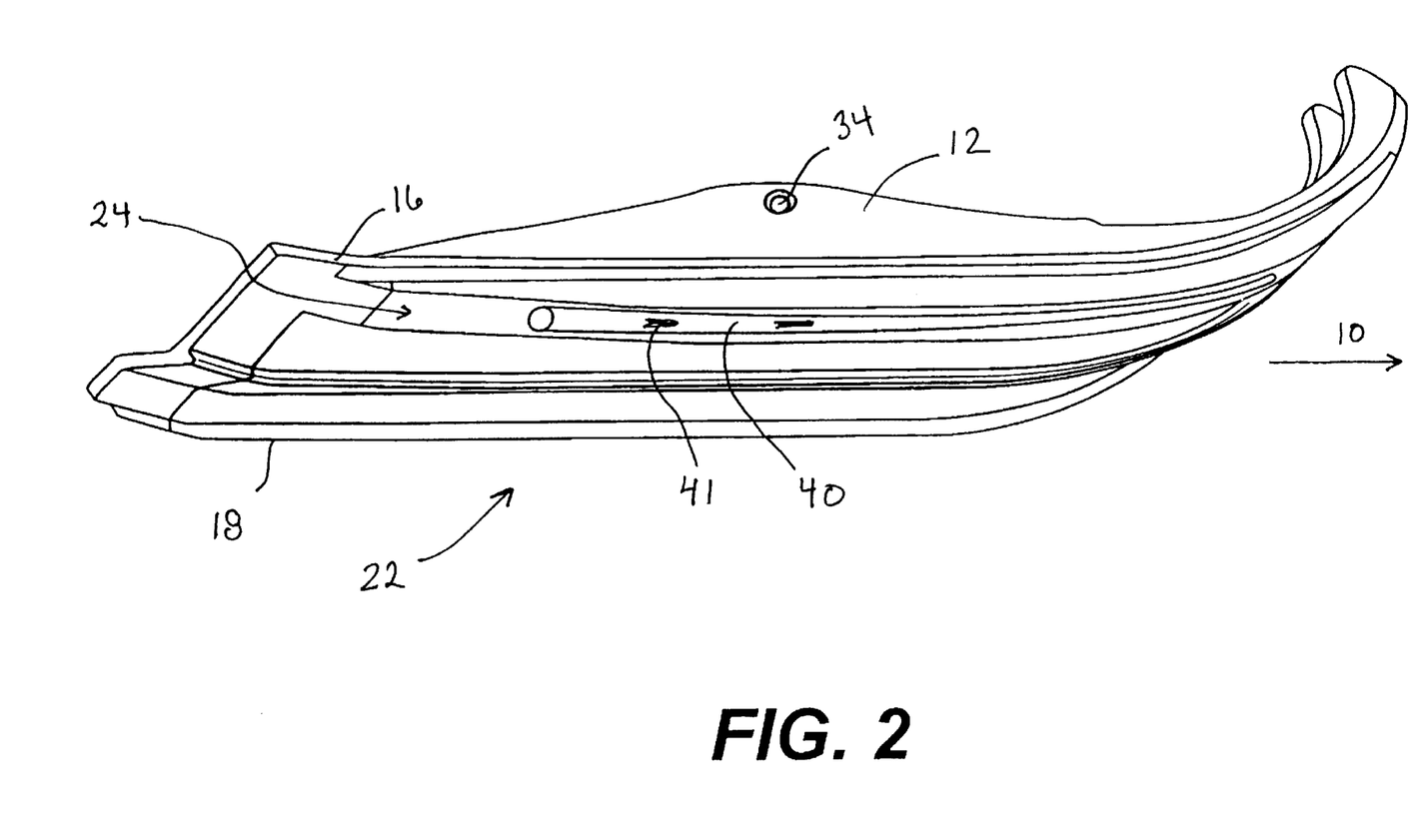
FIG. 2 is a bottom perspective view showing longitudinal ribs and an offset keel of the snowmobile ski shown in FIG. 1.
Figure 3:
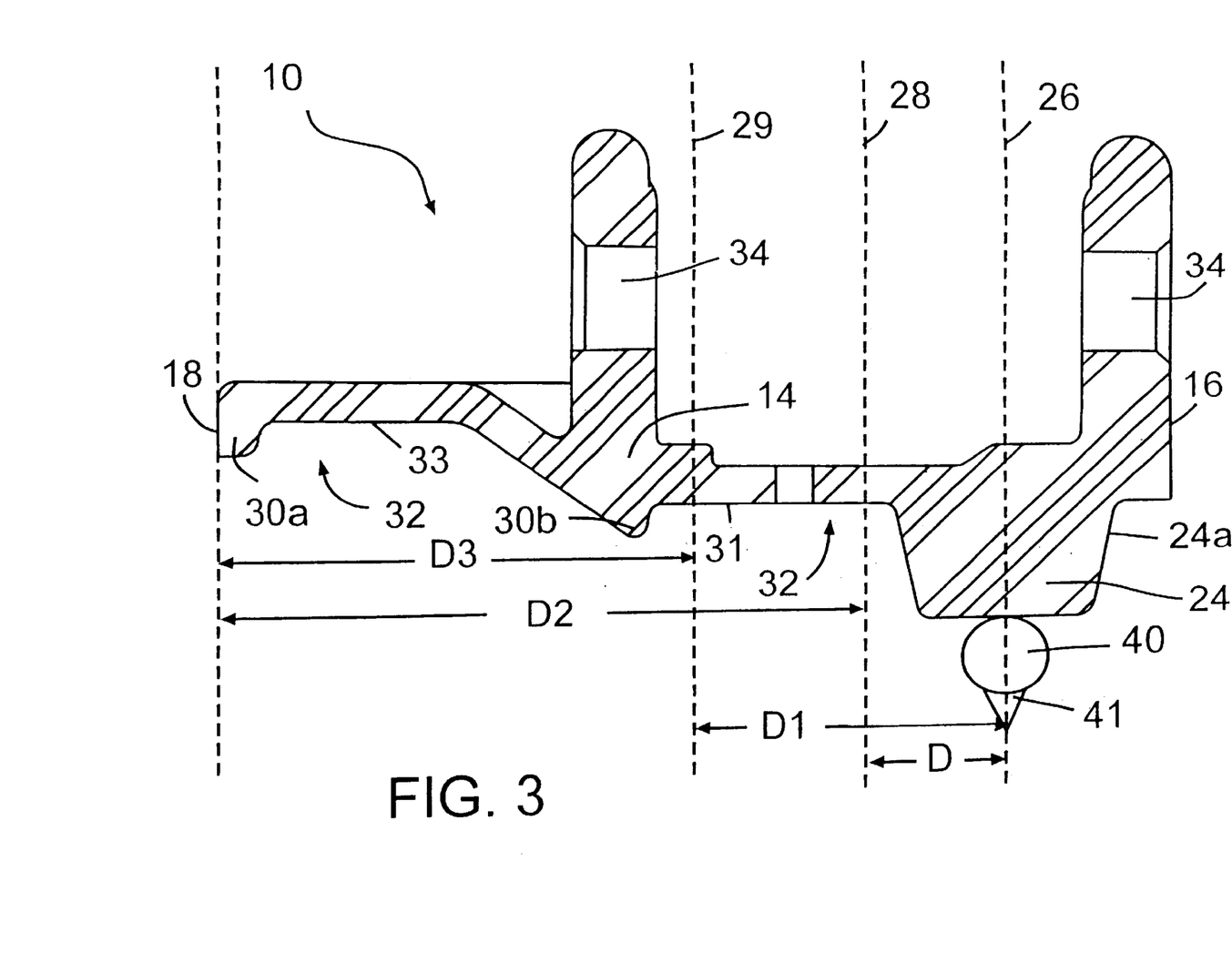
FIG. 3 is a sectional view of the snowmobile ski shown in FIG. 1, taken along line III—III of FIG. 1, and illustrates longitudinal ribs, an offset keel and a runner in accordance with the principles of the present invention.
Figure 4:
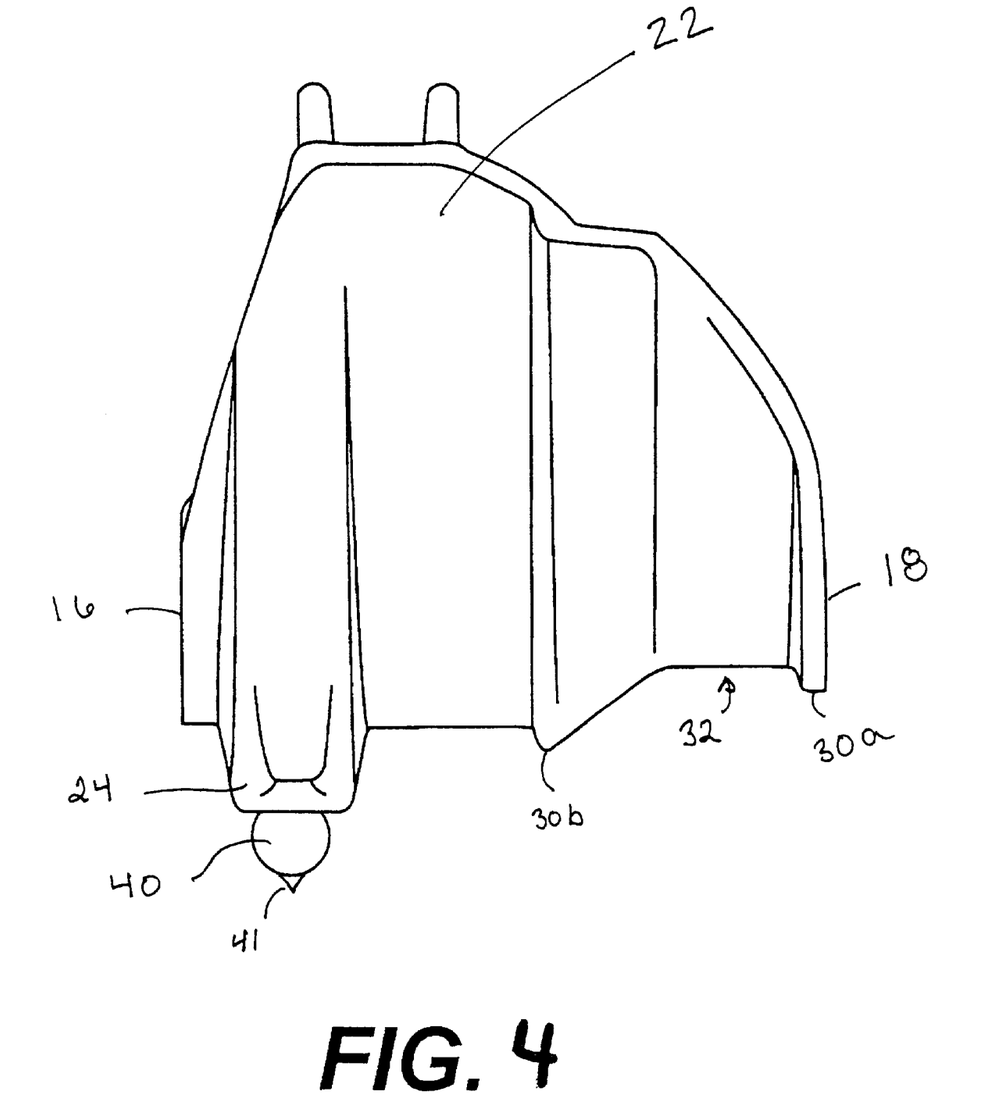
FIG. 4 is a front view of the snowmobile ski shown in FIG. 1.

A wear resistant rod or runner 40, shown in FIGS. 2–4, is attached to the keel 24 on one axial side of the ski body 14. The runner 40 is preferably formed from steel and a carbide material. The carbide material 41 is harder than the steel, and is a particularly suitable choice for the runner since it can withstand extreme wear and abrasion. The positioning of the carbide 41 onto the runner 40 has to be established in such a manner as to improve maneuverability without increasing the steering effort. The positioning is based on the attachment point 34. In addition, since the runner 40 is the most downwardly extending portion of the ski body 14 and has a narrow cross section, the runner 40 functions to accurately guide the movement of the ski 10. The runner 40 is attached to the keel 24 based on a location of a pivot axis of the ski 10 which is determined by a ski leg positioning. The pivot axis is a longitudinal axis of the keel 24 about which the ski 10 pivots during, for example, a turn.

By arranging the runner 40 on the outside of the ski 10, the runner-to-runner stance of the snowmobile is increased. The wider stance of the snowmobile increases the stability of the snowmobile, which of course improves the steering of the snowmobile especially through turns. And, since the positioning of the runner 40 is offset, when the ski is in motion, the offset positioning naturally creates a toe-out configuration of the ski 10, as opposed to a toe-in configuration (due to the operation of a moment between the runner and the ski leg), thereby reducing the tendency of the snowmobile to pitch and dart.

Figure 5:
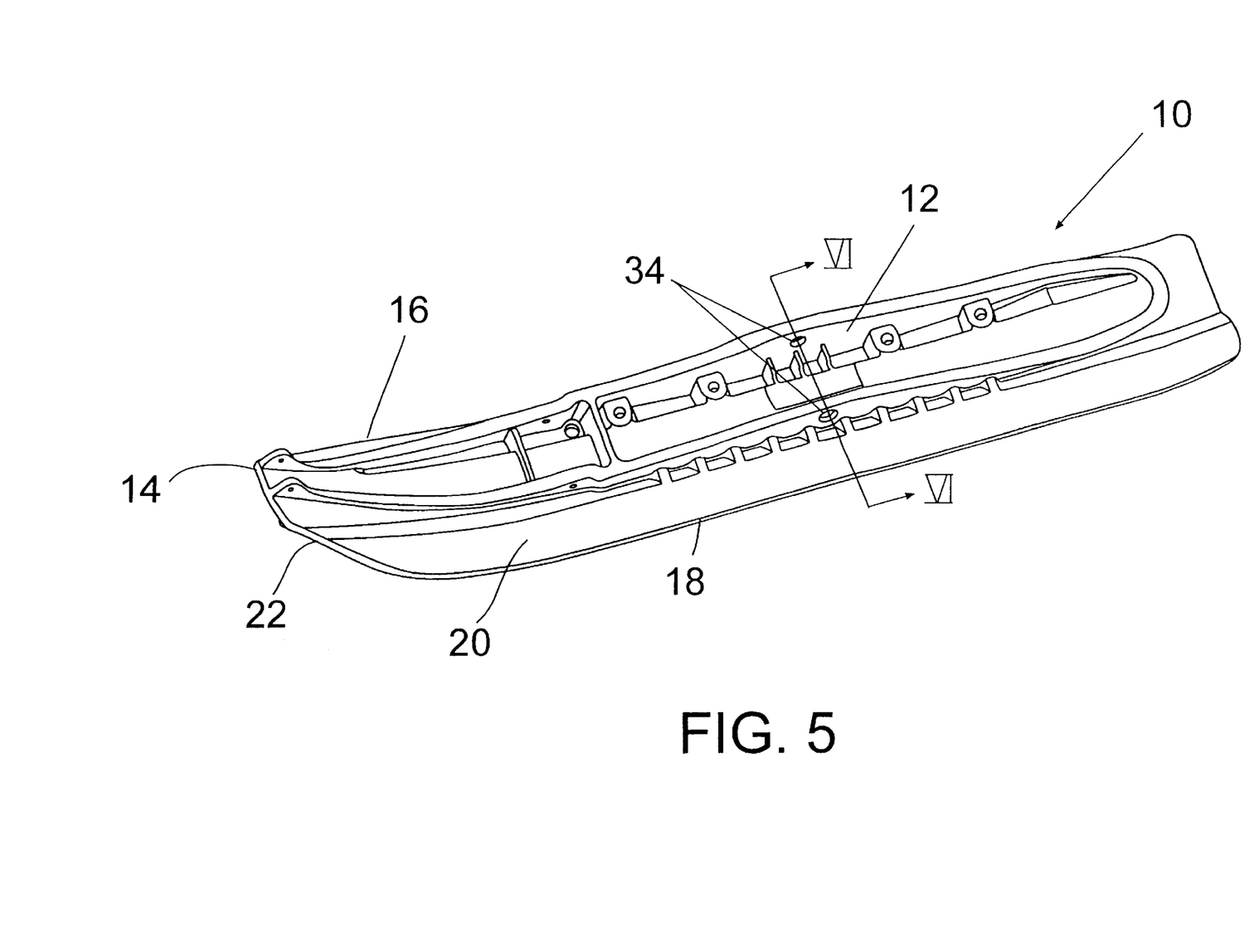
FIG. 5 is a top perspective view of a second embodiment of a snowmobile ski with an integrally molded bridge portion in accordance with the principles of the present invention.
Figure 6:
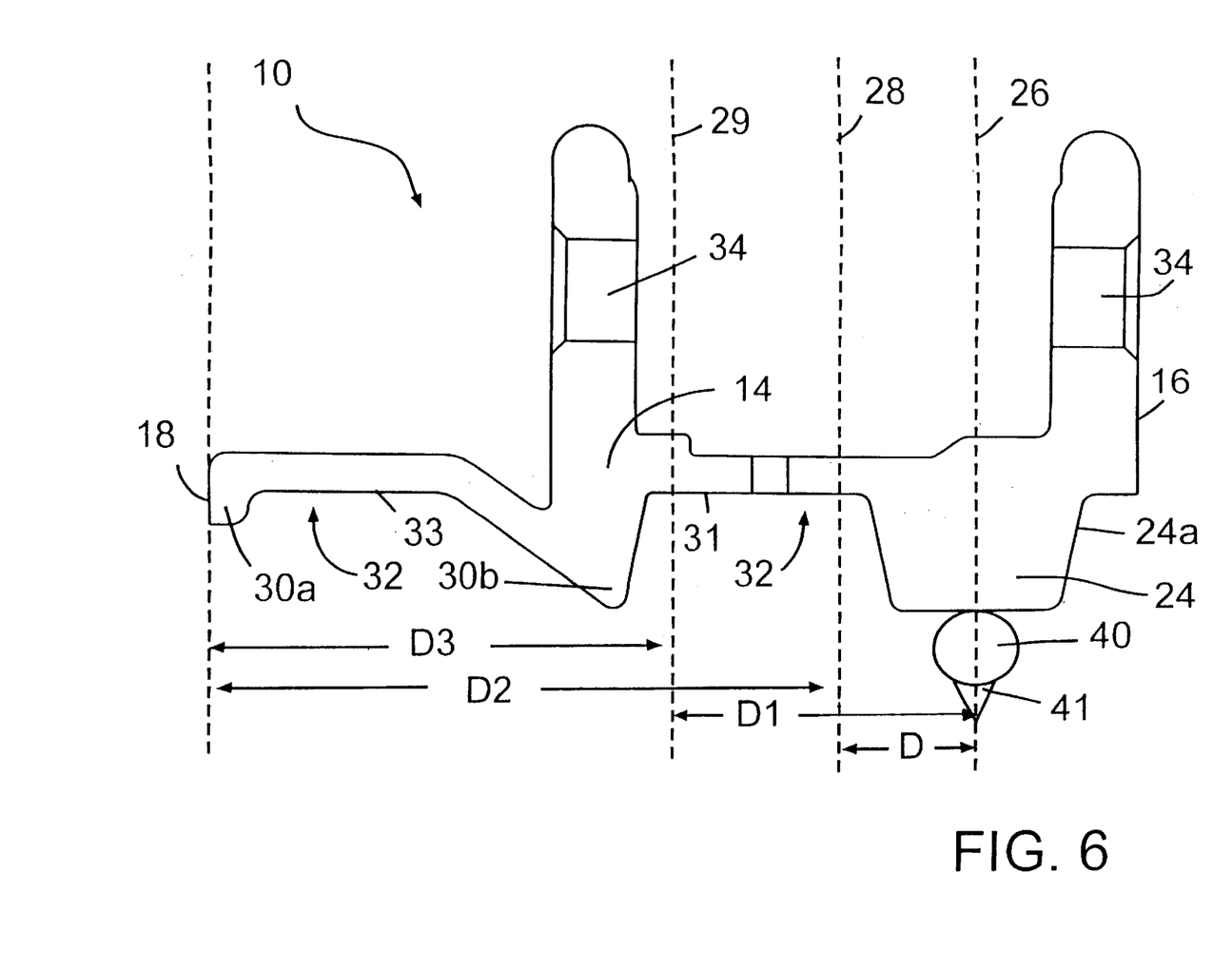
FIG. 6 is a sectional view of the snowmobile ski shown in FIG. 5, taken along line VI—VI of FIG. 5, and illustrates longitudinal ribs, an offset keel and a runner in accordance with the principles of the present invention.

Placing the runner 40 to the outside of the ski body 14 allows for the placement of longitudinal ribs 30a, 30b between the keel 24 and the inner lateral edge 18. In a preferred embodiment, the snowmobile ski is formed with two longitudinal ribs 30a and 30b. However, one skilled in the art will readily recognize that as few as one or as many as a plurality of longitudinal ribs may be provided. Between each of the longitudinal ribs 30a, 30b and the keel 24 are defined snow compacting portions 32. These portions 32 are essentially channel shaped, and have the appearance of being concave or U-shaped. The snow compacting portions 32 are helpful for compacting snow during a side-hilling mode of the snowmobile. The snow compacting portions 32 extend from the ski body 14 at different levels, but as illustrated in a second embodiment shown in FIG's 5 and 6, snow compacting portions 32 situated at the same level.

In a direction from the keel 24 to the inner lateral edge 18, the snow compacting portions 32 are configured preferably such that there is a first stepped portion terminating in a generally horizontal surface 31 bounded by a rib 30b. The rib is followed by a second stepped portion, which terminates in another generally horizontal surface 33, which is bounded by another rib 30a. The arrangement is such that the bottom surface of the ski is generally inclined. This ski body configuration improves the steerability of the snowmobile.

Because of the different levels of the snow compacting portions 32, less snow is pushed by the ski 10. Hence, the ski 10 is easy to steer. The easier steering improves the maneuverability of the snowmobile during fast cornering at high velocities. Generally, as a snowmobile turns on the trail, the weight borne by the two skis will be transferred primarily to one ski. The snowmobile always turns with the outside ski. If you are turning left, you turn with the right ski. In the case of side-hilling, the weight will be borne by the ski that is closest to the side of the mountain.

Conventionally, snowmobile skis have been designed with a wide planar area to the outside of the runner when the runner was not in an offset position with respect to the bridge or the ski itself. This wide planar area to the outside of the runner would compact snow during the turn, making the turn more difficult. With the offset runner being positioned in accordance with the present invention, the runner is close to the inside angle of the turn. Accordingly, steering the ski is easier.

The foregoing detailed description of this invention has been provided for the purposes of illustration and description. It is not intended to be exhaustive or to limit the invention to the precise embodiments disclosed. Other modifications and variations within the spirit and scope of the invention as defined by the appended claims may be evident to practitioners in the art when considered in reference to this disclosure.

What is claimed is:

1. A snowmobile ski, comprising:
    a ski body having an inner lateral edge, an outer lateral edge and a centerline; the ski
    body further having a top surface adapted to be connected to a bridge and a bottom surface adapted for moving over snow; and
    a single keel integrally formed with the ski body and running lengthwise along the bottom surface of the ski body in such a manner that a centerline of the keel is offset from one of a centerline of the bridge and the centerline of the ski body in a direction toward the outer lateral edge of the ski body.

2. The snowmobile ski according to claim 1, wherein an outer surface of the keel is located between the outer lateral edge of the ski body and one of the centerline of the bridge and the centerline of the ski.

3. The snowmobile ski according to claim 2, wherein the bottom surface of the ski body further includes a longitudinally extending rib arranged between the keel and the inner lateral edge of the ski body.

4. The snowmobile ski according to claim 3, wherein the bottom surface of the ski body along side of the longitudinally extending rib defines a snow compacting portion having an essentially channel shape.

5. The snowmobile ski according to claim 4, wherein the snow compacting portion is arranged such that in a direction from the keel to the inner lateral edge there is a first stepped portion terminating in a generally horizontal surface bounded by the rib.

6. The snowmobile ski according to claim 5, wherein the longitudinally extending rib includes a first rib and a second rib arranged along the bottom surface of the ski body.

7. The snowmobile ski according to claim 6, wherein the first rib is followed by a second stepped portion, which terminates in another generally horizontal surface which, is bounded by the second rib.

8. The snowmobile ski according to claim 7, wherein the bottom surface of the ski body along side of the longitudinally extending ribs define snow compacting portions having an essentially channel shape.

9. The snowmobile ski according to claim 8, wherein the snow compacting portions are arranged so that the snow compacting portions are located at different levels.

10. The snowmobile ski according to claim 9, wherein the ski body is compression molded from an ultra high molecular weight plastic.

11. The snowmobile ski according to claim 10, wherein the keel extends downwardly from the bottom surface of the ski body at the outer lateral edge.

12. The snowmobile ski according to claim 1, further comprising a single runner attached to the single keel.

13. The snowmobile according to claim 1, wherein the centerline of the keel is offset from the centerline of the bridge in the direction toward the outer lateral edge of the ski body only.

14. A snowmobile ski, comprising:
    a ski body having an inner lateral edge, an outer lateral edge and a centerline; the ski
    body further having a top surface with an integrally molded bridge adapted to be connected to a ski leg of an a snowmobile and a bottom surface adapted for moving over snow; and
    a single keel integrally formed with the ski body and running lengthwise along the bottom surface of the ski body in such a manner that a centerline of the keel is offset from one of a centerline of the bridge and the centerline of the ski body in a direction toward the outer lateral edge of the ski body.

15. The snowmobile ski according to claim 14, wherein the bottom surface of the ski body further includes a longitudinally extending rib arranged between the keel and the inner lateral edge, and wherein the bottom surface of the ski body along each side of the longitudinally extending rib defines snow compacting portions having an essentially channel shape.

16. The snowmobile ski according to claim 15, wherein each of the snow compacting portions extend from the ski body at different levels, such that the bottom surface of the ski is generally inclined in a direction from the keel to the inner lateral edge.

17. The snowmobile ski according to claim 16, wherein the snow compacting portions are arranged such that in a direction from the keel to the inner lateral edge there is a first stepped portion terminating in a generally horizontal surface bounded by a ridge.

18. The snowmobile ski according to claim 17, wherein the ridge is followed by a second stepped portion, which terminates in another generally horizontal surface which, is bounded by another ridge.

19. The snowmobile ski according to claim 14, further comprising a single runner attached to the single keel.

20. The snowmobile ski according to claim 14, wherein the centerline of the keel is offset from the centerline of the bridge in the direction toward the outer lateral edge of the ski body only.

* * * * *